United States Patent [19]

Ragland, Jr.

[11] 3,954,337

[45] May 4, 1976

[54] METHOD AND APPARATUS FOR DETERMINING THE AVERAGE SIZE OF APERTURES IN AN APERTURED MEMBER

[75] Inventor: Frank Rowland Ragland, Jr., Lancaster, Pa.

[73] Assignee: RCA Corporation, New York, N.Y.

[22] Filed: Oct. 4, 1974

[21] Appl. No.: 512,135

[52] U.S. Cl.................................. 356/109; 356/71; 356/111; 356/159; 250/571
[51] Int. Cl.² ............................................ G01B 9/02
[58] Field of Search............... 356/106 R, 109, 111, 356/159, 71; 250/571, 572; 350/162 SF

[56] References Cited
UNITED STATES PATENTS
3,709,610   1/1973   Kruegle.............................. 356/111

OTHER PUBLICATIONS
Watkins, L. S., "Inspection of Integrated Circuit Photomasks with Intensity Spatial Filters;" *Proc. of the IEEE*, Vol. 57, No. 9, 9/69.

*Primary Examiner*—John K. Corbin
*Assistant Examiner*—Conrad Clark
*Attorney, Agent, or Firm*—G. H. Bruestle; L. Greenspan

[57] ABSTRACT

The average aperture width in a small area of an apertured member, such as a shadow mask for a cathode-ray tube, is determined by passing a beam of substantially monochromatic light through an area of the member to form an interference pattern, detecting the intensities of at least two light fringes of the interference pattern, generating electrical signals which are representative of the detected intensities and then deriving the average width of apertures in the lit area of the member from the generated signals.

10 Claims, 4 Drawing Figures

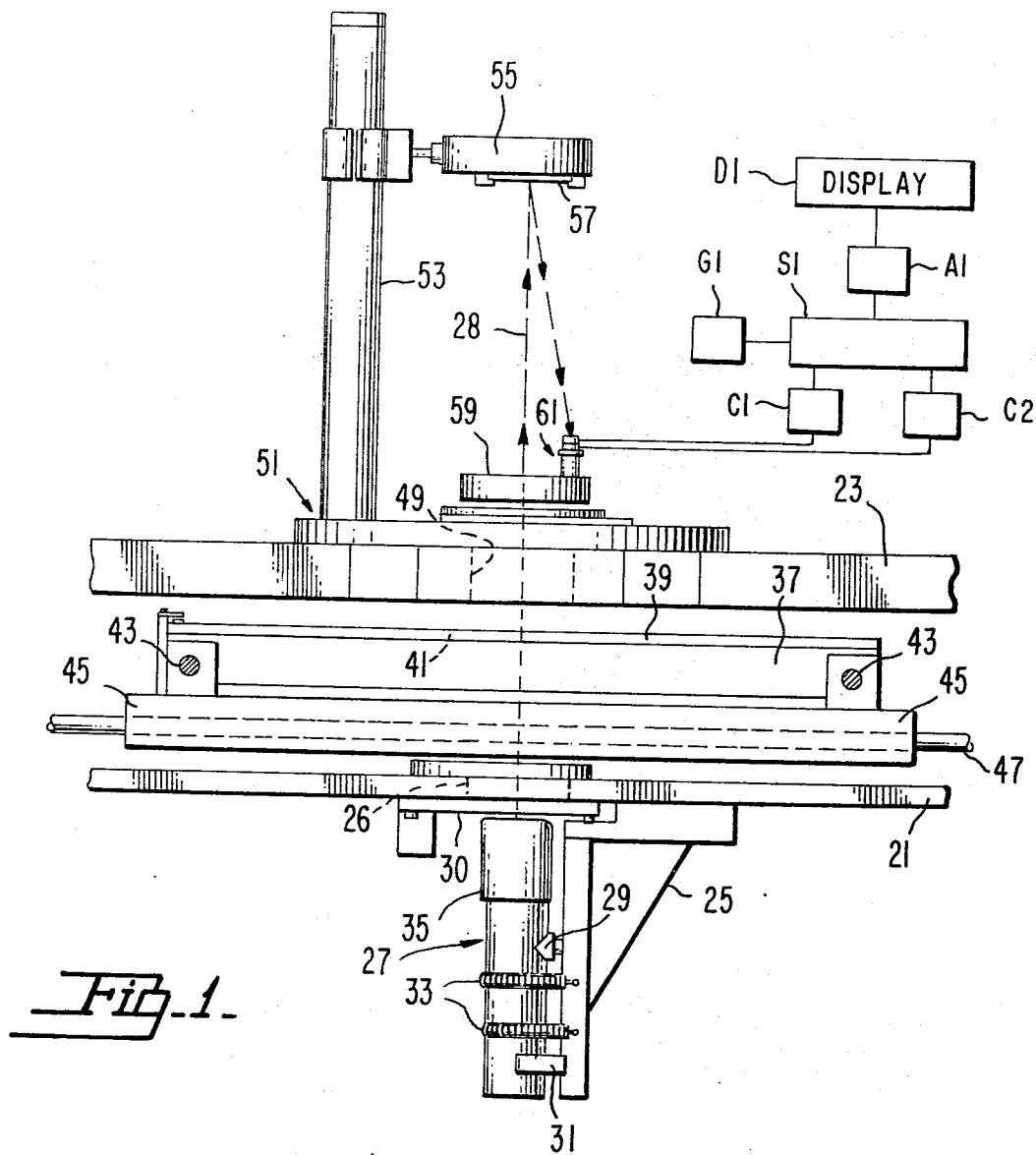
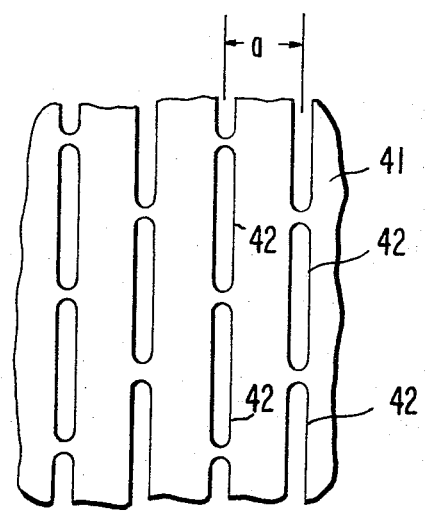

METHOD AND APPARATUS FOR DETERMINING THE AVERAGE SIZE OF APERTURES IN AN APERTURED MEMBER

CROSS REFERENCE TO RELATED APPLICATION

This application is related to application Serial No. 512,228, filed October 4, 1974, by George S. Gadbois et al., and both applications are assigned to the same assignee.

BACKGROUND OF THE INVENTION

This invention relates to a novel method and apparatus for measuring the average size of a group of apertures in a member having an array of similar-sized apertures therein. The invention is especially applicable to measuring the apertures of an apertured mask for a cathode-ray tube.

One type of color television picture tube employs a slit-type apertured mask. Such as mask is comprised of a metal sheet, about 4 to 8 mils thick (about 0.10 to 0.20 mm.), having an array of slits which are about 3 to 10 mils wide (about 0.075 to 0.25 mm.) whose center lines are substantially uniformly spaced about 20 to 80 mils (about 0.5 to 2.0 mm.) apart in parallel rows or columns. The slits may be of uniform width, or the widths may gradually become smaller from center to edge. The slits may be uniform, graduated, or random length in the rows, and are generally about 30 to 60 mils long. At least for quality-control purposes, it is desirable during manufacturing to check the widths of the slits from area to area on a single mask and also to check the widths of the slits from mask to mask.

It is known that projecting a beam of substantially monochromatic light from one side through an array of parallel slit apertures of substantially uniform widths and spacings produces combined interference and diffraction patterns in a plane spaced from the opposite side of the aperture array. The interference pattern is comprised of alternate light and dark bands or fringes. The diffraction pattern is an envelope defined by the peak intensities of the light fringes of the interference pattern. The envelope is also comprised of alternate light and dark bands including a central maximum and uniformly-spaced side maxima (light bands) separated by minima (dark bands). The physical dimensions and spacings of the interference bands and diffraction bands are proportionately related to the average widths and spacings of the apertures which produce them. By prior methods, the average aperture width was derived by measuring one or more of these distances and then calculating the average width. Such prior methods are slow, and the results are not as precise as are desired for quality control during mask manufacturing. Such prior methods do not lend themselves to automation by modern electronic techniques.

SUMMARY OF THE INVENTION

The novel method is based on the discovery that the average aperture width of an apertured member bears a specific relationship to the intensities of the light fringes constituting the combined interference and diffraction patterns produced by the member. This relationship can be closely approximated algebraically over a range of interest in a manner that allows the average aperture width to be calculated rapidly and accurately by electronic techniques.

The novel method comprises projecting a beam of substantially monochromatic light through a plurality of apertures in a relatively small area of an apertured member to produce combined interference and diffraction patterns. Then, the intensities of two light fringes of the interference pattern, preferably in the central maximum of the diffraction pattern, are sensed and generate electrical signals which are a function of the intensities of the fringes. An electrical signal is then derived from the ratio of the generated electrical signals, which derived signal is directly representative of the average widths of the apertures within the beam. A novel apparatus for determining average aperture width includes means for projecting a beam of monochromatic light through a plurality of apertures in an apertured member to produce combined interference and diffraction patterns, and means responsive to said pattern for generating a signal therefrom which is representative of said average width.

In one form of the invention, a low-power laser beam or other source of monochromatic light in a fixed position projects a beam through the apertured member upon two photocells, which are in fixed positions with respect to one another and fixed distances from the member. In a preferred form, the beam is so refracted as to focus the beam upon the photocells, each of which generates an electrical signal in response to the incident light. The member may be stationary or moving linearly when the reading is made since the pattern remains stationary irrespective of translational motion of the work piece. The light beam may vary in intensity or brightness, due, for example, to variations in line voltage. However, the ratio of the intensities of one measured fringe to the other remains constant. With a simple electronic processing circuit, the average width of the apertures within the beam is derived from the generated electrical signals. The derived signal may be used to actuate some automatic process or may be employed to actuate a display of the aperture width.

Only the average width of the apertures is a variable in any particular apparatus set-up. The center lines of the rows of the apertures within the beam are substantially uniformly spaced. The wavelengths of light of the beam are fixed by the choice of the source. The spacing of the work piece to the pattern plane is fixed by the design and adjustment of the equipment. A variation in the average slit width results in a variation in the ratio of the intensities of the interference fringes, which fringes are fixed in position in the plane of the photocells with respect to one another and with respect to the center line of the light beam by the adjustment of the equipment. If, in the apertured member, the center-to-center spacing between adjacent apertures varies substantially, the position of the fringes will shift and cause an apparent change in aperture width. Additional detectors can be used to sense the change in fringe position and can compensate the aperture-width output as well as being used to indicate the extent of the shift. This allows measurement of masks when the aperture spacing is not constant.

BRIEF DESCRIPTION OF THE DRAWINGS

FIG. 1 is a partially-schematic fragmentary front view of a novel apparatus for carrying out the novel method.

FIG. 2 is a fragmentary plan view of a mask having an aligned array of slit apertures therein.

DESCRIPTION OF THE PREFERRED EMBODIMENT

Figure 3:
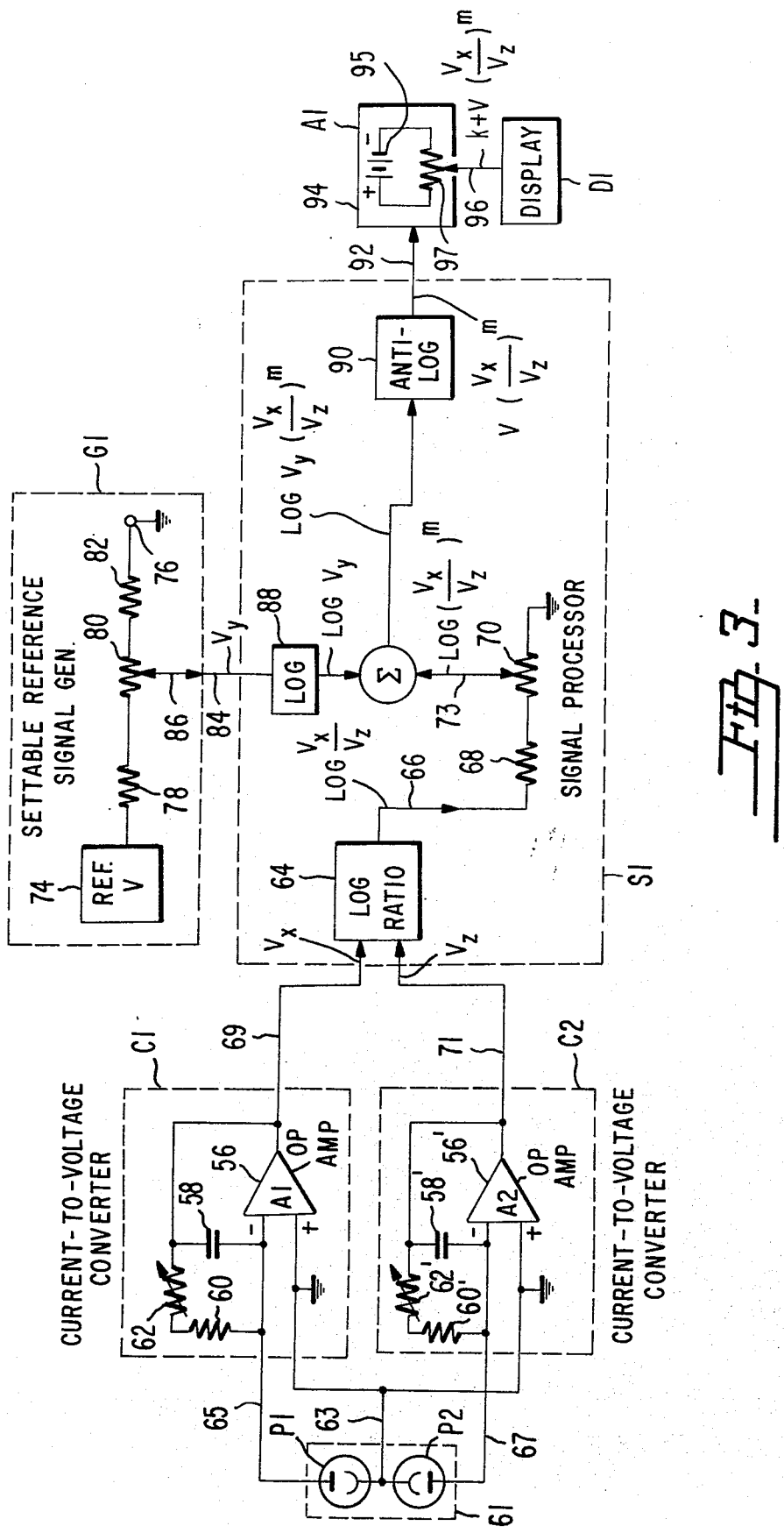
FIG. 3 is a diagram of a circuit used with the apparatus of FIG. 1.

FIG. 1 shows a lower frame 21 and an upper frame 23 mounted in fixed relation to one another by means that are not shown. The bottom side of the lower frame 21 carries a laser-mounting bracket 25 on which is mounted a helium-neon laser tube 27 which is held in two guides 29 and 31 by two springs 33. A ten-power converging lens in a lens holder 35 is mounted on the output side of the laser tube 27, so that a light beam 28 from the laser tube 27 may be projected upward through the lens in a manner that avoids destructive effects to persons working in the area. Any monochromatic-light source may be used in place of the particular laser tube 27. A low-power helium-neon laser is preferred because of its relatively low initial cost, low cost of operation and relatively high safety. The lens may be of any convenient size, power and optical characteristic capable of producing a light spot of the desired size in the plane of the apertured mask to be measured and also a focused spot in the plane of the detector 61 described below.

The lower frame 21 has an opening 26 therein to permit the light beam 28 from the laser tube 27 to pass upward therethrough, and carries a shutter 30 for intercepting or passing the beam 28 as desired. The top side of the lower frame 21 supports a mask carrier 37 and means for guiding the movement thereof in a generally horizontal plane, normal to the path of light beam. The carrier 37 includes a removable insert 39 having an open portion adapted to shape and size to receive an apertured mask 41 to be measured. The carrier 37 may be moved in one direction (designated the y direction) on two y guide rods 43 on two supports 45. The supports 45 may be moved in the other direction (designated the x direction) on two x guide rods 47 supported on the lower frame 21 in a manner not shown. The arrangement of x and y guide rods 43 and 47 permits the apertured mask 41 in the carrier 37 to be translated rapidly through the beam 28 to measure different areas on the mask.

The top portion of the upper frame 23 supports a light-tight box (not shown) in a position roughly centered over the laser tube 27 and a crossplate 51. The upper frame 23 has an opening 49 therein to permit the light beam 28 from the laser tube 27 to pass upward therethrough. A vertical mounting post 53 supported by the crossplate 51 carries a first adjustable support 55 and a plane mirror 57 thereon. A second adjustable support 59 carrying a fringe detector 61 thereon is supported on the crossplate 51. In operation, the supports 55 and 59 are adjusted for the mirror 57 to receive and reflect light from the laser tube 27 to the fringe detector 61.

The fringe detector 61 comprises two photocells P1 and P2 in a single container a known distance apart and is used to detect simultaneously two different fringes of an interference pattern. Of course, photocells in separate containers may be used. More than two photocells may be used. The outputs of the fringe detector 61 are fed to a circuit system, which is described in greater detail with respect to FIG. 3, comprising two current-to-voltage converters C1 and C2, a settable reference-signal generator G1, and signal processor S1, and an "add-k" circuit A1. The circuit system derives the desired width dimension and then displays it numerically on a display D1.

FIG. 2 shows a fragment of an apertured mask 41 having a plurality of slit apertures 42 arranged lengthwise in columns and spaced apart in uniform center-to-center spacing $a$ with respect to the next adjacent column of apertures. The apertures ideally should have identical widths $b$. In producing the apertured mask 41, the center-to-center aperture spacing $a$ is, by the nature of the manufacturing process, fixed for a given apertured mask. There is a negligible variation of the center-to-center spacing $a$ from one apertured mask to another. However, the apertures are produced by a process wherein the slit widths $b$ may vary substantially in the same mask and from mask to mask. Therefore, it is important to be able to ascertain the average width $b$ of a plurality of apertures 42 over small areas in a given apertured mask.

The present invention takes advantage of the fact that when a monochromatic light beam is projected through an array of apertures, an interference pattern is formed wherein the ratio of the intensities of two fringes of the pattern, preferably adjacent fringes in the central maximum, is a function of the average aperture width of the area illuminated. It can be shown that the average width $\bar{b}$ is defined by the polynomial equation:

$$\bar{b} = \alpha + \beta R + \gamma R^2 + \ldots + \delta R^n \qquad (1)$$

where $R$ is ratio of the intensities. A good approximation of this relationship is $$\bar{b} = k + V_y R^m \qquad (2)$$

where $k$, $V_y$ and $m$ are preselected values that are determined empirically for each type of mask. These values are determined for each mask type. Such determinations are within the abilities of one skilled in this art. By type of mask is meant a mask having distinctive aperture size range, aperture spacings, or other characteristics which have a substantial effect on the values of $k$, $V_y$ and $m$.

In the circuit system shown in FIG. 3, the two outputs of photocells P1 and P2 representing the intensities of two fringes of the interference pattern are used to produce signals $V_x$ and $V_z$ in the current-to-voltage converters C1 and C2 respectively. The circuit then derives the average aperture width $\bar{b}$ according to the relationship $\bar{b} = k + V_y (V_x/V_z)^m$ where $k$, $V_y$, and $m$ are present values for each type of mask or other apertured member. The output is then applied to a suitable display D1, which may be a commercially-available digital panel display apparatus. The display D1 includes an analog-to-digital converter and a digital display device for displaying the magnitude of the analog signal applied as an input thereto.

The converters C1 and C2 are substantially identical, and therefore a description of only one will be provided. The same numbers with and without the primes refer to similar parts in the converters C1 and C2. Converter C1 is comprised of an operational amplifier 56 and a filtering capacitor 58 in parallel with serially-connected resistances 60 and 62 connected between the output and the inverting input of the amplifier 56. The noninverting input of amplifier 56 is connected to a point of reference potential such as ground. The values of the resistances 60 and 62 determine the gain of the operation amplifier 56. The resistance 62 is variable for adjusting the output voltage on the output lead 69 within a desired range suitable for use with the signal processor S1. The capacitor 58 serves as a low pass filter for filtering out instantaneous changes in intensity in the light source. The output signal $V_x$ on the output lead 69 of converter C1 is a signal whose voltage amplitude represents the intensity of the light received by the first photocell P1. In a similar manner, the voltage amplitude of the signal $V_z$ on output lead 71 from converter C2 represents the intensity of the light received by the second photocell P2.

The output leads 69 and 71 are connected to the input of the log ratio device 64 which forms a part of the signal processor S1. The log ratio device 64 produces a signal whose voltage magnitude is representative of the logarithm of the ratio of the amplitude of signal $V_x$ with respect to the amplitude of the signal $V_z$. The output of the log ratio device 64 is applied through a lead 66 to a serially-connected resistance 68 and variable resistance 70 and then to a summation device 72 through a first wiper arm 73. The values of the resistances 68 and 70 determine the value of the exponent $m$, the power to which the ratio $V_x/V_z$ is raised.

A reference-signal generator G1 includes a source of a reference voltage 74 whose output is connected to a reference potential such as ground at a terminal 76 through voltage-dividing resistors 78, 80 and 82. A second wiper arm 86 on the resistance 80 is connected to the output lead 84 of the generator G1. The setting of the second wiper arm 86 determines the value of the generated signal $V_y$ appearing on the lead 84.

The lead 84 is connected to the signal-processor summation device 72 through a logarithm device 88 which produces the logarithm of the value of the amplitude of signal $V_y$. The summation device 72 produces a signal representing the sum of the logarithm of signal $V_y$ and the logarithm of the ratio of signals $V_x/V_z$ raised to the $m$ power, or log $V_y(V_x/V_z)^m$. This signal is applied as an input to an antilog device 90 which provides a signal whose amplitude represents the antilog of the signal applied to the input thereof. The output signal of the antilog device 90 is applied along lead 92 to an adder device A1, which adds the value $k$ to the signal-processor output. The adder device A1 is comprised of a voltage source 95 and a variable resistor 97 in parallel. A third wiper arm 96 (whose position determines the value of $k$) of the variable resistor 97 is connected to a suitable analog-to-digital converter and digital display device D1.

The log ratio device 64, the antilog device 90, the logarithm device 88, the summation device 72 and the reference voltage source 74 are commercially-available devices. Such devices are manufactured in a single multifunctional module; for example, model number 433J manufactured by Analog Devices, Inc. of Norwood, Mass. A description of that device is provided in a catalog C125-10 dated May 1972 and published by Analog Devices, Inc.

In setting up the apparatus for operation, the height of the platform 55 above the crossplate 51 is set to give the desired fringe spacing at the detector 61. In one example, the light path from the holder 39 to the detector 61 is about 60 inches and the centers of the photocells P1 and P2 are about 0.054 inch apart. The outputs of the converters C1 and C2 are adjusted so as to be substantially equal with equal amounts of light incident on the photocells P1 and P2. This can be accomplished by suitable display means, such as the display D1, temporarily coupled directly to the leads 69 and 71 by means not shown. The circuit for the signal processor 54 described above is responsive to voltage inputs along the leads 69 and 71 having a value in the range of 0 to 10 volts. The outputs of the converters C1 and C2 are adjusted by adjusting the resistances 62 and 62' respectively. With no mask 41 in place and equal amounts of light on the photocells P1 and P2, the signals $V_x$ and $V_z$ are matched. Then, a mask 41 is placed in the mask holder 37 and a beam 28 is passed through the mask. The lens in the holder 35 is adjusted to focus the beam on the detector 61, and the detector 61 is positioned in the focused beam so that the desired fringes are detected and so that the value of $V_z$ is greater than the value of $V_x$.

Three standard aperture masks of the same type whose aperture widths $b$ are maximum, bogie, and minimum respectively (as predetermined by precise measurements in a measuring microscope or the like) are provided. The mask with maximum aperture size is first inserted in the measuring light beam 28. The third wiper arm 96 is now positioned so that a correct reading is shown on the display D1. Next the mask with minimum aperture size is inserted into the beam 28. The second wiper arm 86 in the settable reference signal generator G1 is positioned so that a correct reading of the hole size appears on the display D1. Next, the mask with the bogie aperture size is inserted in the light beam 28 and the first wiper arm 73 of the resistor 70 is positioned so that a correct reading appears on the display D1. With the first, second and third wiper arms 73, 86 and 96 so positioned, which determines the values of $m$, $V_y$ and k respectively, the procedure is repeated to position these wiper arms more precisely so that a proper reading appears on the display for each of the three standard masks inserted in the light beam 28. The positions of the three wiper arms 96, 86, and 73 are noted and these values can be used whenever masks of the same type are to be measured. A similar setting-up procedure is employed for each type of mask.

To operate the apperatus of FIGS. 1 and 3, a mask 41 with slit-shaped apertures therein is placed in the holder 39. The mask may be a flat, etched sheet prior to being formed into the domed shape for use in a color television picture tube. However, the apparatus may also be used with a formed mask. The laser tube 27 is turned on so that the beam 28 is projected upward and a proper positioning of the three wiper arms 96, 86, and 73 is made in accordance with the positions noted for that type of mask. The mask holder 39 is slid into a desired position on the $x$ and $y$ guides 43 and 47, and the average aperture width for the area illuminated by the beam appears on the display D1. The mask holder 39 may be moved to different positions to measure the average widths of apertures at different areas of the mask. Then, the mask may be removed from the holder, a different mask of the same type is inserted therein and the measurement process repeated.

Figure 4:
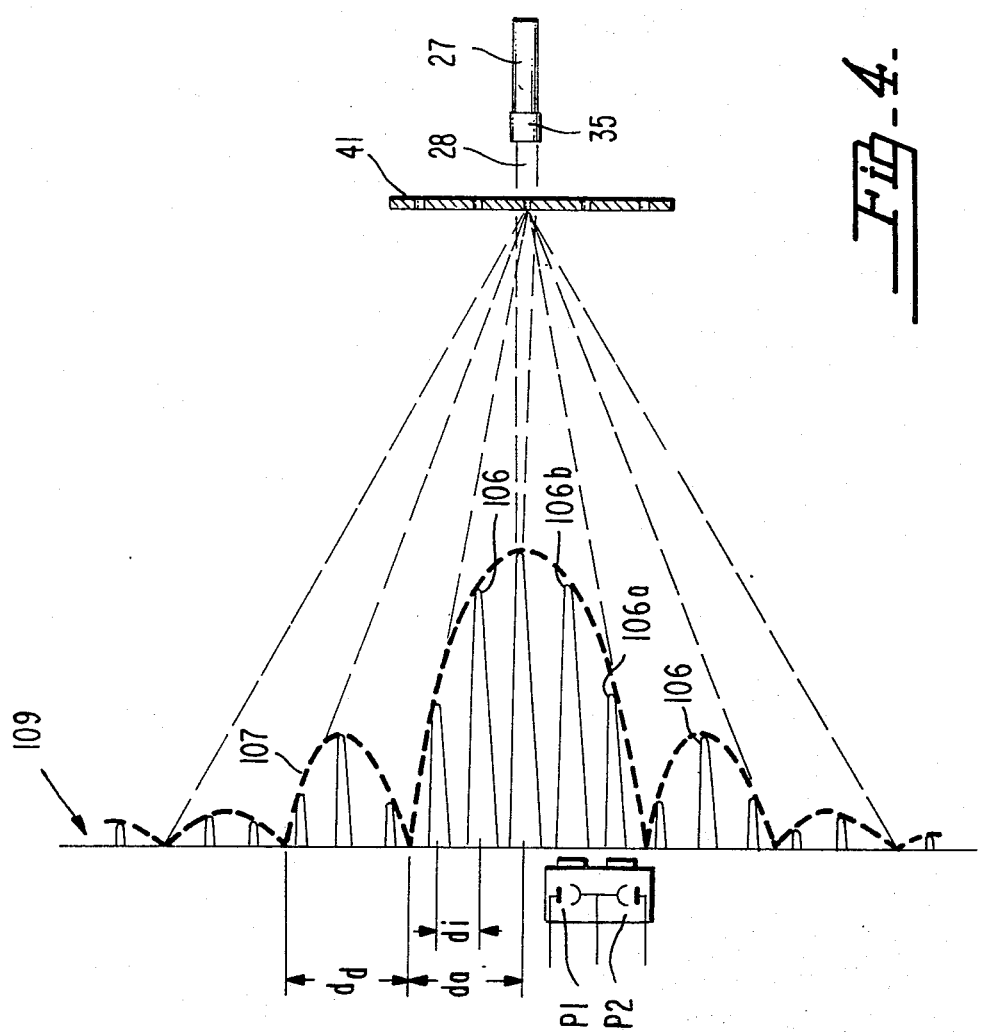
FIG. 4 is a schematic diagram used to explain some of the optical effects used to carry out the method of the invention.

FIG. 4 illustrates in simplified form what happens in the optical system as the beam 28 passes from the laser tube 27 through the apertured member 41 to the detector 61. The laser tube 27, a 5-mw HeNe laser, is fitted with a lens system that expands the laser beam and then focuses the expanded beam in the plane 109 of the detector 61. By changing the power of the lens system, the beam size can be changed in order to change the number of mask apertures in the measurement. In one system, a 10 power magnification lens produces a beam that is about ½ inch in diameter where it passes through the mask 41. The intensity across the beam 28 has nearly a Gaussian distribution; consequently the apertures near the center of the beam transmit more light than those near the edges of the beam and have a stronger influence on the measurements. The mask 41 is placed so that the beam impinges on the mask 41 perpendicular to its surface. As the beam strikes the mask 41, diffraction occurs and fringes 106 of an interference pattern can be observed in the detector plane 109, which is placed at a convenient distance from the apertured mask 41. The greater the distance, the greater the spacing of the fringes of the interference pattern. The fringes 106 are substantially uniformly spaced a distance $d_i$ apart. The detector 61 is positioned to receive two adjacent light fringes 106a and 106b on the two photocells P1 and P2 respectively. In FIG. 4, the brightness of fringes is indicated by the horizontal distance of the curve 106 from the detector plane 109. With the light source focused in the plane 109 of the detector 61, the pattern appears stationary even when the mask 41 is moved linearly. Rotation of the mask will cause the pattern to rotate in the plane 109, but it will remain centered on the same axis.

Also in FIG. 4, there is shown an envelope 107 defined by the peaks of the fringes 106, which defines a diffraction pattern. The diffraction pattern comprises a central maximum and side maxima. The distance $d_1$ between the peaks of the fringes 106 is an inverse function of the distance between rows of apertures in the mask 41. The width $d_a$ of a side maximum equals the half width $d_o$ of the central maximum of the diffraction pattern, and are inverse functions of the aperture width. The relative height or intensities of the various fringes 106 of the interference pattern are determined by aperture width.

The novel device provides fast, accurate and reliable means of measuring the sizes of shadow-mask apertures. The device was developed primarily for measurement of slit widths in flat, slit-type shadow masks. It has shown a capability for measuring webs (the distance between the ends of two slit apertures in a row) and can be extended to measure apertures in formed masks and masks having round apertures as well as mask masters. Some advantages of this method over previously employed methods (transmission and microscope) are 1. improved accuracy,
2. faster speed of measurement, and
3. improved ability to average a large number of apertures or to measure individual apertures with the same operating speed.

I claim:

1. A method for determining the average width of the apertures in a limited portion of a regular array of similar apertures in an apertured member, said method comprising
    a. projecting a beam of substantially monochromatic light through a plurality of apertures in said limited portion of said member, thereby producing combined light interference and diffraction patterns containing the desired width information,
    b. detecting the intensities of at least two interference fringes of said patterns,
    c. generating electrical signals which are representative of said detected intensities, and then
    d. deriving from said generated electrical signals the average width of said apertures through which the beam has passed.

2. The method defined in claim 1 wherein said apertures are substantially rectangular slits arranged lengthwise in rows.

3. The method defined in claim 2 wherein said apertures are about 3 to 10 mils wide and are located on center lines which are substantially uniformly spaced about 20 to 80 mils apart.

4. The method defined in claim 2 wherein said detected fringes include the two adjacent fringes on one side of the central maximum of said diffraction pattern.

5. The method defined in claim 1 wherein said deriving step (d) includes producing from said generated signals a ratio signal which is representative of the average width of said apertures, and then converting said ratio signal into an average width value.

6. A method for determining the average width of the apertures in a limited portion of a regular array of similar apertures in an apertured mask for a cathode-ray tube, said mask having two opposite major surfaces, said method comprising
    a. projecting a beam of substantially monochromatic light from a source spaced from one of said major surfaces through a plurality of apertures in adjacent rows of said limited portion of said mask,
    b. focusing said beam in a plane spaced from the other of said major surfaces of said mask, thereby producing combined light interference and diffraction patterns in said plane,
    c. detecting the intensities of at least two interference fringes in the central maximum of said diffraction pattern, the ratio of said intensities being a function of the average width of said plurality of apertures,
    d. producing from said detected intensities an electrical signal which is representstive of the ratio of said intensities,
    e. processing said produced electrical signal to provide an output electrical signal of a value which is directly representative of said average width of said plurality of apertures.

7. The method defined in claim 6 including the further step of displaying the average width manifested by said output electrical signal.

8. An apparatus for determining the average aperture width of a plurality of apertures in a cathode-ray tube apertured mask comprising
    means for projecting a beam of substantially monochromatic light through said plurality of apertures in said portion of said mask to produce a combined light interference and diffraction pattern containing aperture width information,
    means responsive to said pattern for providing at least two signals representing the intensities of at least two fringes of said pattern, and
    means responsive to said two signals for generating an electrical output signal therefrom representing the average width of said plurality of apertures.

9. The apparatus defined in claim 8 wherein said projecting means includes means for producing a laser beam along a prescribed path, means for focusing said beam upon said responsive means, and means for holding said apertured mask in said beam with the major surfaces thereof substantially normal to the path of said beam.

10. The apparatus defined in claim 9 wherein said mask-holding means includes also means for translating said mask in a plane that is substantially normal to the path of said beam.

* * * * *

UNITED STATES PATENT OFFICE
CERTIFICATE OF CORRECTION

PATENT NO. : 3,954,337
DATED : May 4, 1976
INVENTOR(S) : Frank Rowland Ragland, Jr.

It is certified that error appears in the above-identified patent and that said Letters Patent are hereby corrected as shown below:

Column 3, line 69    change "G1, and signal" to
                     --G1, a signal--

Column 4, line 50    change "present" to --preset--

Signed and Sealed this

Thirteenth Day of July 1976

[SEAL]

Attest:

RUTH C. MASON
*Attesting Officer*

C. MARSHALL DANN
*Commissioner of Patents and Trademarks*